(12) United States Patent
Narayanaswami et al.

(10) Patent No.: US 8,762,205 B2
(45) Date of Patent: Jun. 24, 2014

(54) METHOD FOR DELIVERING BUSINESSES ENTERPRISES ADVERTISING VIA INSTANT MESSAGING

(75) Inventors: Chandrasekhar Narayanaswami, Wilton, CT (US); Danny Soroker, Larchmont, NY (US); Young Sang Paik, Seoul (KR); Herbert S. McFaddin, Yorktown Heights, NY (US); Francois Huaulme, Paris (FR); Sean Lee, Tokyo (JP)

(73) Assignees: International Business Machines Corporation, Armonk, NY (US); Institute for Information Technology Advancement (KR)

( * ) Notice: Subject to any disclaimer, the term of this patent is extended or adjusted under 35 U.S.C. 154(b) by 1547 days.

(21) Appl. No.: 12/016,013

(22) Filed: Jan. 17, 2008

(65) Prior Publication Data
US 2009/0187623 A1  Jul. 23, 2009

(51) Int. Cl.
*G06F 19/00* (2011.01)
*G06Q 30/00* (2012.01)

(52) U.S. Cl.
USPC .................. 705/14.64; 705/14.45; 705/14.49; 705/14.56

(58) Field of Classification Search
USPC ............... 705/14, 14.64, 14.45, 14.49, 14.56; 709/206
See application file for complete search history.

(56) References Cited

U.S. PATENT DOCUMENTS

| | | | |
|---|---|---|---|
| 6,449,657 B2 | 9/2002 | Stanbach, Jr. et al. | |
| 6,519,639 B1 | 2/2003 | Glasser et al. | |
| 6,549,937 B1 | 4/2003 | Auerbach et al. | |
| 6,628,770 B1 | 9/2003 | Jain et al. | |
| 6,631,412 B1 | 10/2003 | Glasser et al. | |
| 6,707,890 B1 | 3/2004 | Gao et al. | |
| 6,714,793 B1 | 3/2004 | Carey et al. | |
| 6,760,580 B2 | 7/2004 | Robinson et al. | |
| 6,813,608 B1 | 11/2004 | Baranowski | |
| 6,895,438 B1 | 5/2005 | Ulrich | |
| 6,907,447 B1 | 6/2005 | Cooperman et al. | |

(Continued)

FOREIGN PATENT DOCUMENTS

KR  1020030095581 A  12/2003

OTHER PUBLICATIONS

PCT Search Report for PCT/US 08/84118 Mailed Jan. 12, 2009.

(Continued)

*Primary Examiner* — John G Weiss
*Assistant Examiner* — Marilyn G Macasiano
(74) *Attorney, Agent, or Firm* — Cantor Colburn LLP; William J. Stock (57) ABSTRACT

Exemplary embodiments of the present invention relate to a method for advertising a business enterprise via an instant messaging (IM) environment comprising registering at least one business enterprise computing system application with an IM server and registering at least one subscriber with the IM server, wherein a subscriber logs on to the IM server via an IM client application that resides at a computing device. The method further comprises delivering subscriber characteristics comprising at least one of the geographic location of a subscriber's computing device, the subscribers preferences, and subscriber status to the IM server, wherein the IM server utilizes the subscriber characteristics to determine the business enterprises that are relevant to subscriber, and publishing the presence status of the determined business enterprises to the subscriber's computing device, wherein the presence status of a business enterprise is displayed to the subscriber within a contact list displayed at the computing device.

25 Claims, 5 Drawing Sheets

(56) References Cited

U.S. PATENT DOCUMENTS

| | | |
|---|---|---|
| 6,965,886 B2 | 11/2005 | Govrin et al. |
| 6,976,086 B2 | 12/2005 | Sadeghi et al. |
| 7,010,110 B2 | 3/2006 | Jorasch et al. |
| 7,013,290 B2 | 3/2006 | Ananian |
| 7,020,480 B2 | 3/2006 | Coskun et al. |
| 7,051,036 B2 | 5/2006 | Rosnow et al. |
| 7,069,009 B2 | 6/2006 | Li et al. |
| 7,082,418 B2 | 7/2006 | Levy et al. |
| 7,088,995 B2 | 8/2006 | Rao |
| 7,089,590 B2 | 8/2006 | Judge et al. |
| 7,095,829 B2 | 8/2006 | Claudatos et al. |
| 7,110,514 B2 | 9/2006 | Brown et al. |
| 7,113,803 B2 | 9/2006 | Dehlin |
| 7,127,685 B2 | 10/2006 | Canfield et al. |
| 7,181,519 B2 | 2/2007 | Pillai et al. |
| 7,185,116 B2 | 2/2007 | Apfel et al. |
| 7,200,413 B2 | 4/2007 | Montemer et al. |
| 7,224,778 B2 | 5/2007 | Aoki |
| 7,231,035 B2 | 6/2007 | Walker et al. |
| 7,260,201 B2 | 8/2007 | Jorasch et al. |
| 7,356,565 B2 | 4/2008 | Zimmermann et al. |
| 7,593,984 B2 | 9/2009 | Morris |
| 7,596,599 B1 | 9/2009 | Maghsoodnia et al. |
| 7,610,343 B2 | 10/2009 | Ikezawa et al. |
| 2002/0184089 A1* | 12/2002 | Tsou et al. .................. 705/14 |
| 2004/0039629 A1 | 2/2004 | Hoffman et al. |
| 2004/0186766 A1* | 9/2004 | Fellenstein et al. ............. 705/14 |
| 2005/0130641 A1 | 6/2005 | Lorraine Scott |
| 2006/0031293 A1 | 2/2006 | Thommes et al. |
| 2006/0093125 A1 | 5/2006 | Dezonno |
| 2006/0167977 A1 | 7/2006 | Wu et al. |
| 2006/0190531 A1 | 8/2006 | Mihaylo et al. |
| 2006/0245391 A1 | 11/2006 | Vaidya et al. |
| 2006/0271696 A1 | 11/2006 | Chen et al. |
| 2007/0033252 A1 | 2/2007 | Combest |
| 2007/0121867 A1 | 5/2007 | Ozugur et al. |
| 2008/0229304 A1 | 9/2008 | Bengtsson et al. |
| 2008/0320082 A1 | 12/2008 | Kuhlke et al. |
| 2009/0006528 A1 | 1/2009 | Batni et al. |

OTHER PUBLICATIONS

Patentability Report & Written Opinion for International Application No. PCT/US2008/084118 with International Filing Date Nov. 20, 2008.

* cited by examiner

METHOD FOR DELIVERING BUSINESSES ENTERPRISES ADVERTISING VIA INSTANT MESSAGING

BACKGROUND OF THE INVENTION

1. Field of the Invention

This invention relates to IM enabled device usage, and particularly to the advertising of business enterprises via an instant messaging environment.

2. Description of Background

Typically, instant messaging (IM) systems require the use of an IM client program to facilitate instant messaging service operations wherein individuals are capable of textually communicating in real time. Conventionally, an IM system comprises a network of IM client devices, the IM clients being networked via an IM server or a network of IM servers. A functional aspect provided by most IM clients is the ability to track and display to a client user the network presence information in regard to individuals that are maintained within an IM client's displayed contact list (frequently referred to as a "buddy list" or "buddy group"). In operation, an IM client user selects contacts (buddies) and assigns the contacts to the contact list (buddy list/group). When a respective contact is online, the contact is automatically advertised to the IM client as being available for IM communication. Accordingly, when the IM client user is online the presence of the IM client user is also advertised to any contacts on whose list that their contact information resides.

SUMMARY OF THE INVENTION

The shortcomings of the prior art are overcome and additional advantages are provided through the provision of a method for advertising a business enterprise via an instant messaging (IM) environment. The method comprises registering at least one business enterprise computing system application with an IM server and registering at least one subscriber with the IM server, wherein a subscriber logs on to the IM server via an IM client application that resides at a computing device. The method further comprises delivering subscriber characteristics comprising at least one of the geographic location of a subscriber's computing device, the subscribers preferences, and subscriber status to the IM server, wherein the IM server utilizes the subscriber characteristics to determine the business enterprises that are relevant to subscriber, and publishing the presence status of the determined business enterprises to the subscriber's computing device, wherein the presence status of a business enterprise is displayed to the subscriber within a contact list displayed at the computing device.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

Exemplary embodiments of the present invention provide a solution to enable an interaction framework that is based upon IM technologies. As such, the exemplary embodiments extend the notions and affordances of IM chat sessions to interactions between a computing device user and a business enterprise infrastructure device. Thus, businesses enterprises can present themselves on a contact list and enable subscribers to interact with them. This particular aspect facilitates the rapid interaction between a customer base and the business enterprise. In further exemplary embodiments a computing device user may have to directly register with the business enterprise, wherein the registration process could include a fee and also provide differentiated access to customers (e.g., access based on customer fee amount, loyalty, etc.).

Exemplary embodiments of the present invention relate to a business enterprise advertisement solution utilizing an interaction framework that is based upon IM. As such, business enterprise identifiers are populated within the contact list of a mobile computing device user, wherein standard and custom services and availability status information of the business enterprise are pushed to the user at their computing device. In operation a chat session corresponds to an interaction between the user on her personal device and the business enterprise. Further, as the physical location of the users mobile device changes, businesses enterprise identifiers may dynamically be added or removed from the contact list.

Figure 1:
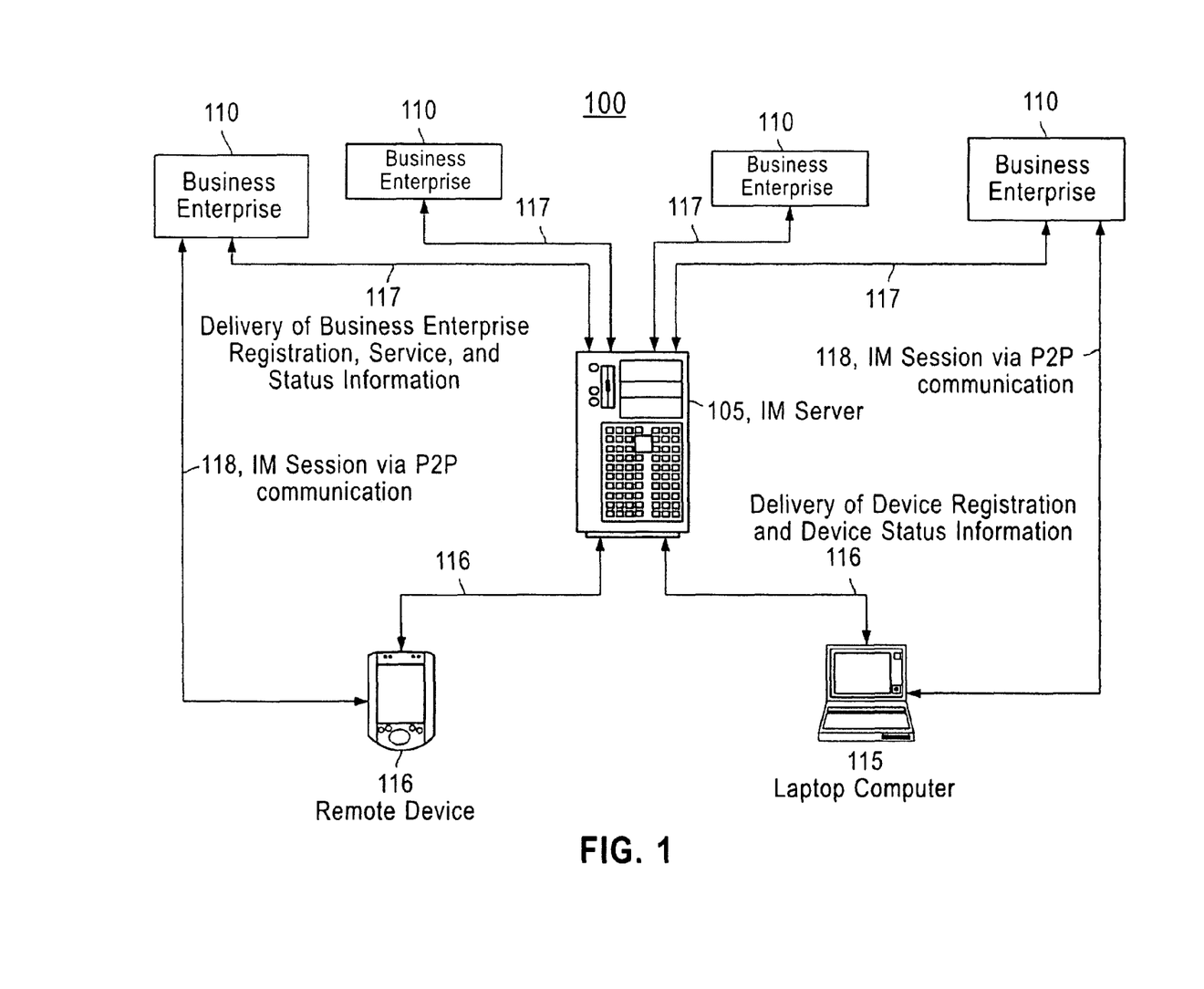
FIG. 1 illustrates one example of one example of a system for advertising business enterprises within an IM environment in accordance with exemplary embodiments of the present invention.

Turning now to the drawings in greater detail, it will be seen that in FIG. 1 there is system for the delivering of business enterprise advertisement information 100. The system 100 comprises an IM server executing an IM application, a plurality of business enterprise computing systems 110 and at least one mobile computing device 115 (e.g., a smart phone, laptop computer, etc.), wherein the computing device executes an IM client application. Each computing device (110, 115) registers its existence with the IM server 105, wherein thereafter the business enterprise computing systems 110 and the mobile computing devices 115 communicate with each other via peer-to-peer communication (e.g. using a friend-to-friend network communication) in order to directly communicate with each other during an IM chat session.

Within the exemplary embodiments each business enterprise must register with the IM server 105 via their computing system 110. The registration information submitted by a business enterprise computing system 110 comprises service information (e.g., the types of services provided by a business, the physical locations of business units, etc.) that is associated with the business enterprise in addition to availability status information. This information is periodically updated by the business enterprise computing system 110 and delivered to the IM server 105.

A mobile computing device 115 user that wishes to receive business enterprise service advertisements via an IM environment must also register with the IM server 105. The registration information that is associated with the mobile device user comprises a device identifier in addition to information in regard to the physical location of the mobile computing device. The physical location of the mobile computing devices 115 is determined (e.g., by the use of GPS, RFID transponder localization, or radio frequency signal triangulation, user manual input, etc.) and periodically or continually reported to the IM server. Additionally, each businesses enterprise computing system 110 comprises an agent (not shown) that is in communication with the IM server 105. Further, the IM client executed on the user's mobile computing device 115 is configured for interaction with a businesses enterprise computing system 110.

Once the mobile device 115 and business enterprise computing system have been registered with the IM server 105 an identifier 216 that is associated with the business enterprise can be listed within a contact list 205 (FIG. 2) business category 215 that is displayed by the IM client executing at the mobile device 115. Identifiers for a business enterprise can either automatically populate a contact listing upon the registration of the business enterprise computing system 110 or be added and removed from the contact listing based upon the physical proximity of the mobile computing device 115 to the physical business enterprise that is associated with the business enterprise computing system 110.

Figure 2:
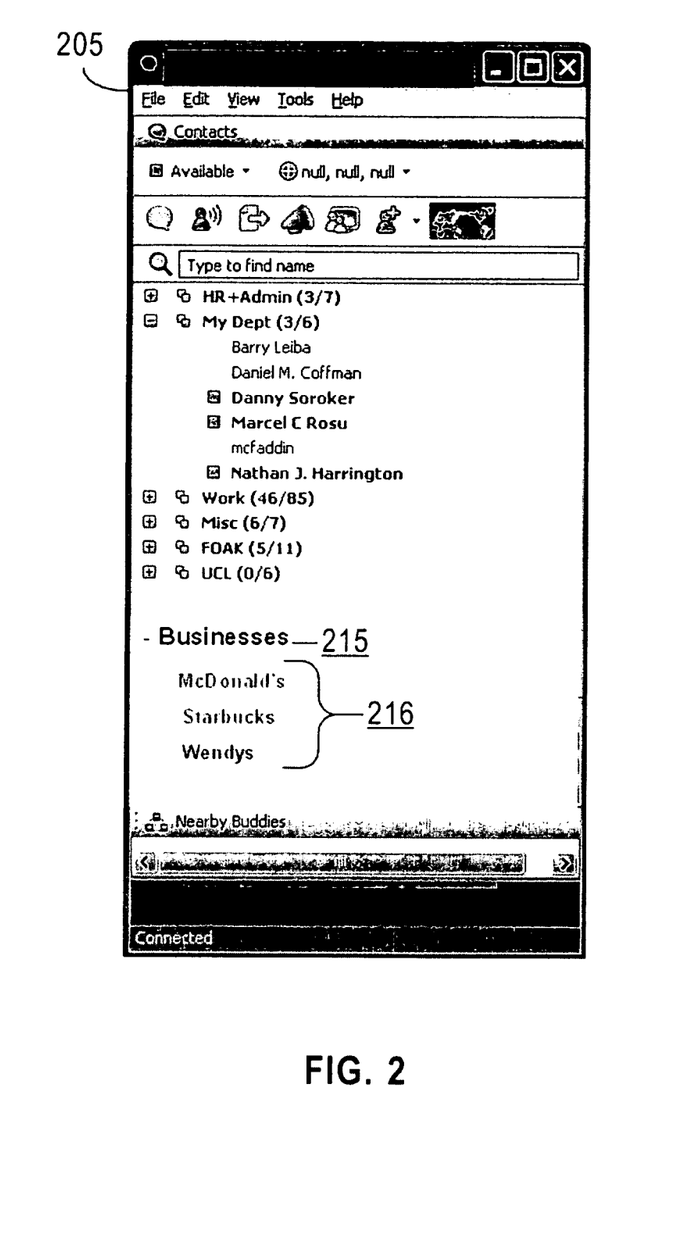
FIG. 2 illustrates one example of an IM contact list wherein a listing of available business enterprises is displayed in accordance with exemplary embodiments of the present invention.

Once displayed upon the contact list 205, a user may select a business identifier 216 from the contact list 205 just as she would choose a friend on her contact list 205. By selecting a business identifier 216 from the contact list 205 the user is able to determine the location, service status, and availability status of the business enterprise in addition to being able to initiate an IM chat service session via the business enterprise computing system 110.

Within exemplary embodiments the contact list 205 is populated with the identifiers of business enterprises 216 that are within a predetermined physical proximity of the registered mobile computing device 115. As such, where in the instance that the user physically carries the mobile computing device 116 into and away from the predetermined physically proximity of the business enterprise's physical location the geographic information pertaining to the mobile computing device 115 is reported to the IM server 105. Since the business enterprises have registered their locations with the IM server 105 and periodically transmit their status information to the IM server 105, the IM server 105 can determine the locations of business enterprises that are in physical proximity to the mobile computing device. Thus, the identifiers 216 that are associated with business enterprise locations that the user moves the mobile computing device 115 in proximity to are automatically displayed in the contact list 205, and in the instance that the mobile computing device 115 user exits the predetermined physical proximity of an business enterprise the identifier 216 for the business enterprise is removed from the displayed contact listing 205. Within further exemplary embodiments a mobile computing device 115 user may enact rules that dictate the types of business enterprises that may be displayed within a contact listing 205, in addition to enacting protocols for the ranking and prioritization of business enterprises identifiers 216 that are displayed within a contact list 205.

A mobile computing device 115 user initiates an IM session with a business enterprise computing system 100 by selecting the identifier 216 that is associated with the business enterprises computing system 100 from the displayed contact list 205. Within the utilization of peer-to-peer communication, the device and system (115, 110) can require that each party present security tokens by the other party before an active or potential IM association is created (e.g., a business enterprise must present a security token to the user's mobile computing device prior to the business enterprise" identifier appearing in the user's contact list). Once an IM session has been initiated the business enterprise can broadcast its presence status (i.e., its relative availability to interact with the user and one or more services—e.g., the business enterprise's hours of operation, location information, a user's account balance information, order status information, information on material goods, etc.) that are made available through the user's contact list.

Within exemplary embodiments a mobile device 115 user can further interact with the business enterprise computing system using a "chat window." In this scheme the user can send commands to a business enterprise computing system 110. Typically the commands entered by the user may be selected from a human understandable command set exposed via the chat session or in free form text. The commands get interpreted by an agent running on the business enterprise computing system 110. These commands can be encoded in a mark up language (e.g., such as XML). One example of a command could be a payment command by which the user pays for the service he wants from the business enterprise via an IM session. An agent on the business could validate the payment that is submitted by the user. Further, standard forms of electronic payment can be used including paying by credit, debit cards, store cards, etc. Additional commands could include a request to detail how many people are waiting to initiate IM sessions with the business enterprise computing system 110.

Figure 3:
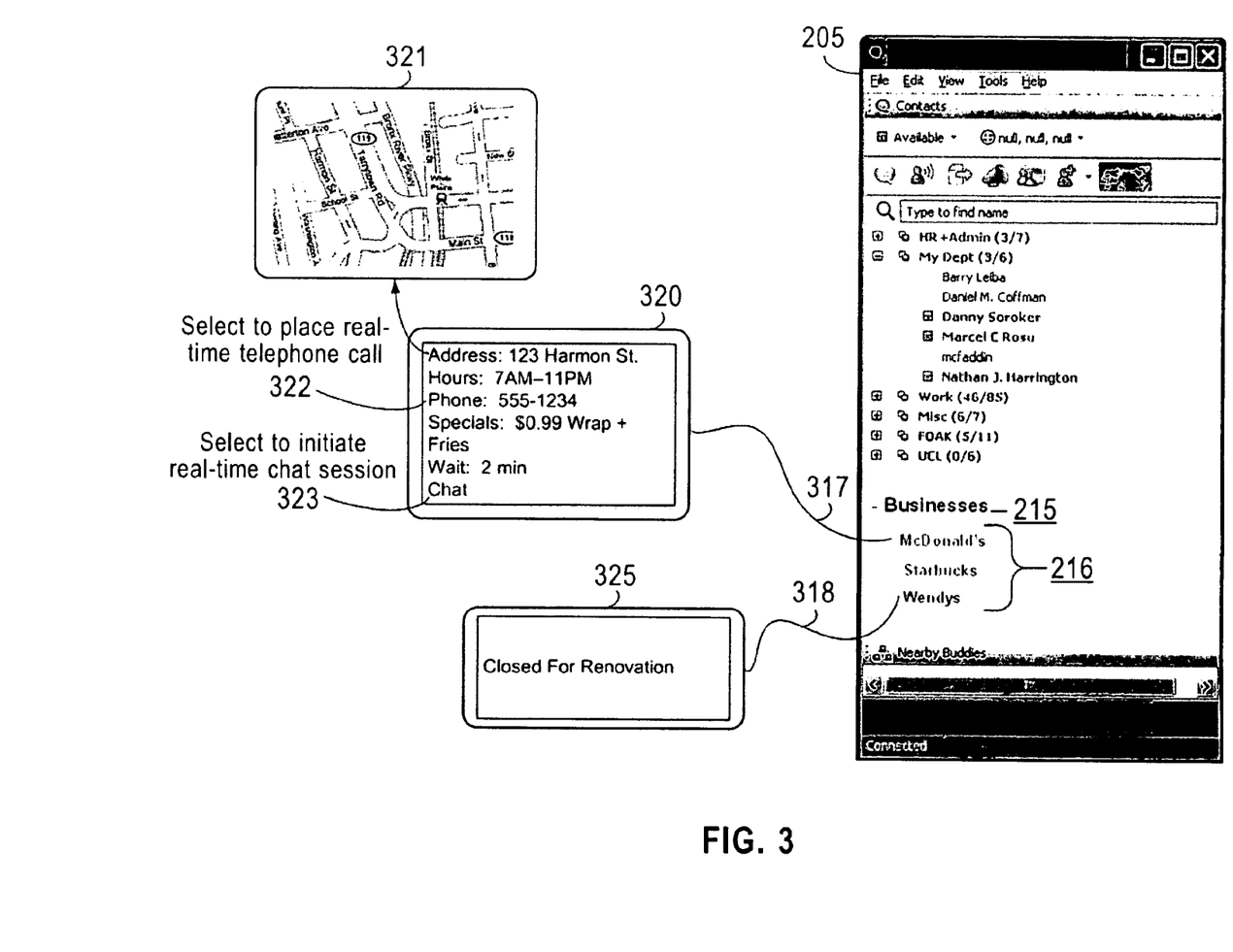
FIGS. 3-5 illustrate examples of an IM contact listing showing business enterprise service details that a device user may access in accordance with exemplary embodiments of the present invention.

For example, as shown in FIG. 3, a user has selected the business enterprise identifiers 317 and 318 in order to initiate IM sessions with the respective business enterprise computing systems 110 that are associated with the business identifiers 317, 318. In the instance that the business identifier 317 was selected, the mobile device 115 user is presented with an IM chat window 320 containing information that is related to the business enterprise. The user can further drill down in order to obtain more specific information pertaining to the business enterprise. For example, the user can be presented with a map showing the physical location of the business enterprise 321, initiate a real-time telephone call to the business enterprise (i.e., when the session is initiated from a cell phone or other smart phone device) 322, or initiate a real-time IM chat session with will a representative of the business enterprise 323 by selecting a link that is associated with the information from the chat window 320. Additionally, a business enterprise can advertise general messages such the message posted within the chat window 325 that is associated with the business enterprise identifier 318.

Figure 4:
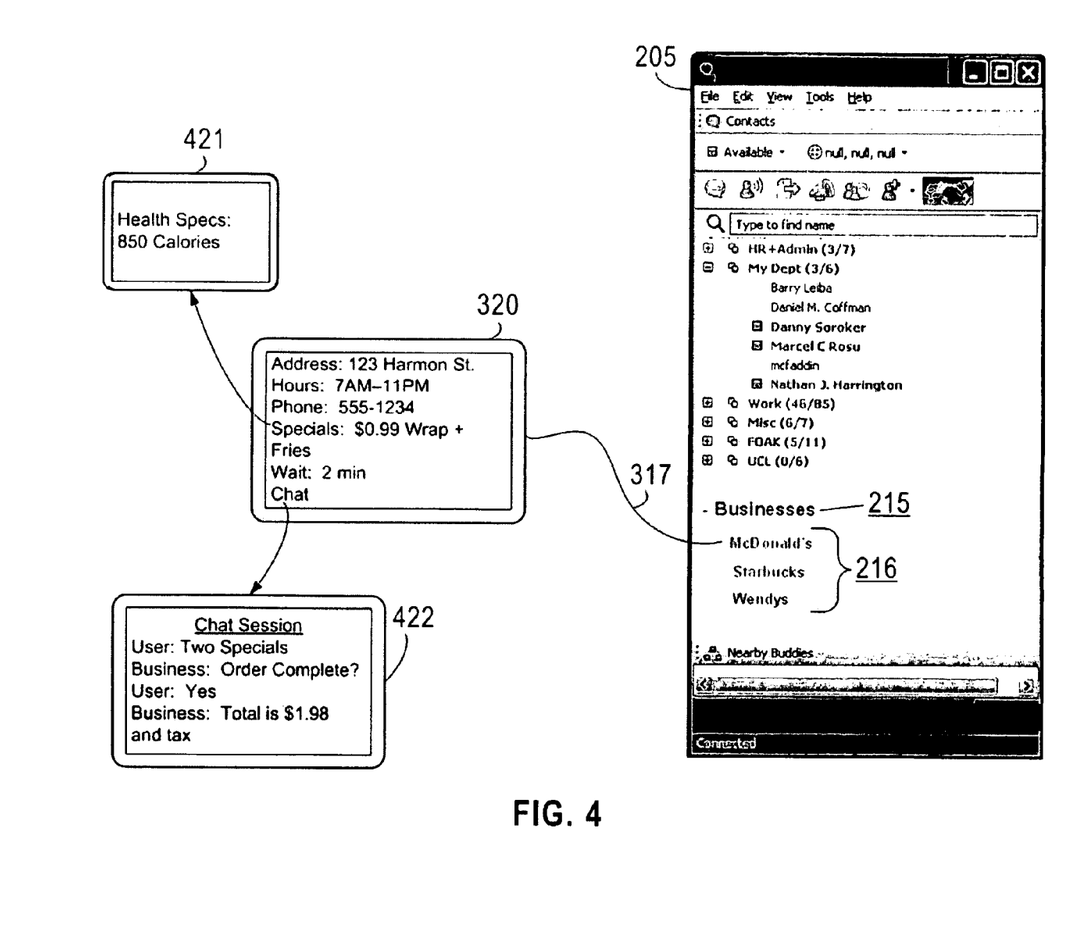
Figure 5:
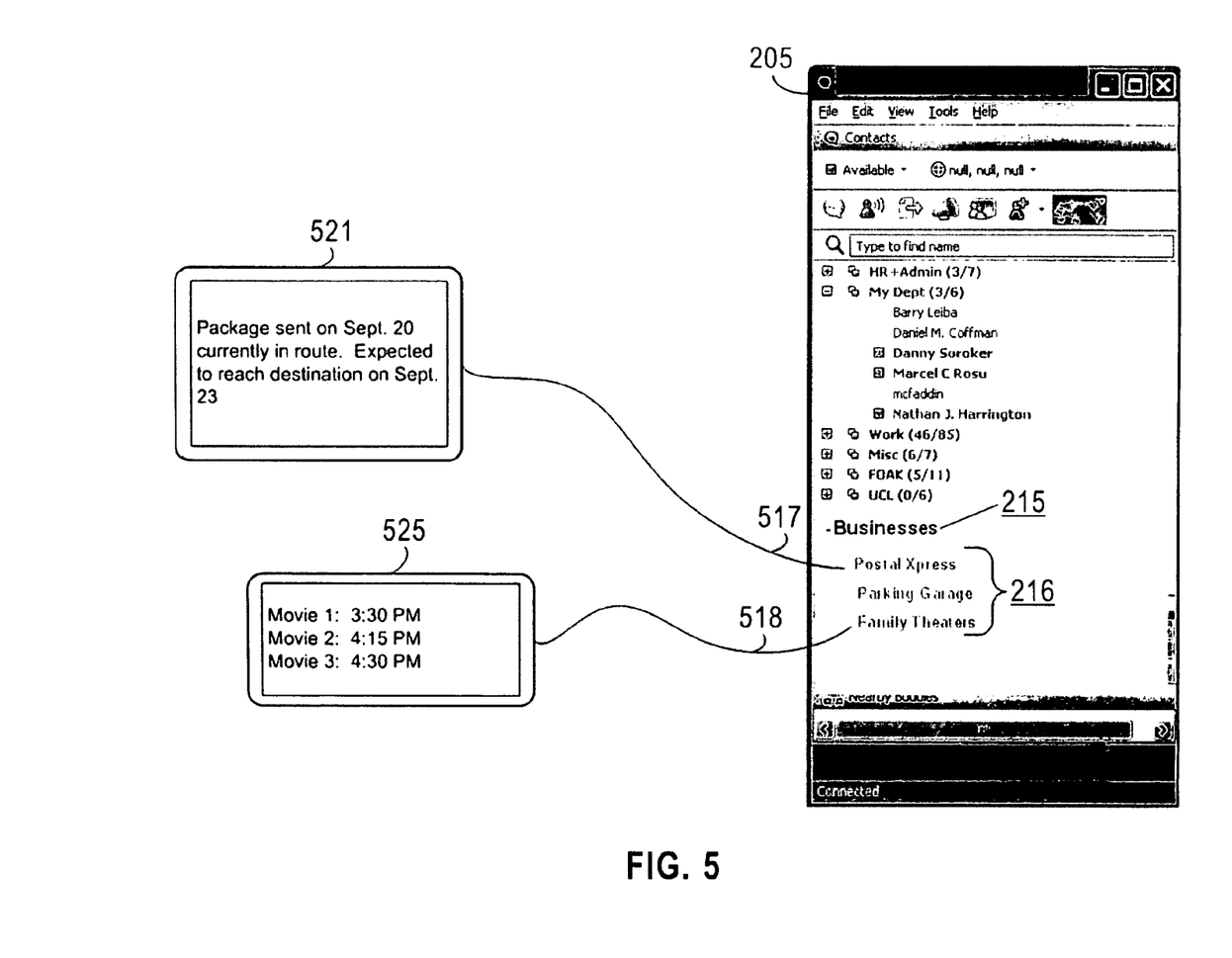

Further examples of advertisements presented to a mobile device 115 user could be specific to the type of business the business in which the enterprise is engaged. For example, a restaurant could display its menu or "today's specials" as a popup (320) when the user selects the business, or allow the user to make a reservation for a table. A restaurant could further customize its advertisements by providing the and menu for a restaurant that is in proximity to the user in addition to allowing a user to place an order via a live chat session (422 of FIG. 4) or providing information relating to the health specifications of a given course 421 in the instance that a user selects the business identifier 317 that is associated with the advertised information. Similarly, as shown in FIG. 5, a movie theater chain identifier 518 can be associated with information pertaining to the show times of a nearby theater (525). Similarly, a user may select a business identifier 517 of a parcel delivery service in order to gain access to package tracking information 521. In additional examples, a parking garage could display the location of an empty parking space, or an airline could show the departure time and gate information for specific flights.

Each business enterprise can provide its own services by using a common API that can be used to publish and render its respective services. In further exemplary embodiments business enterprises can provide customized advertisement information that is based upon the user's IM session activity. As such, a business enterprise computing system 110 further comprises an IM activity software tracking component (not shown). The purpose of the IM software tracking component is to gather data in regard to a user's activities (i.e., what information for a business enterprise what accessed, for how long, etc.). This information is used to determine any additional information or content that a user may find desirable. Thus once the additional information or content is identified, it is made available to user via the contact list 205 during an interactive IM session.

In some instances an IM session may require that the user communicate with the business enterprise in order to retrieve dynamic information. In this instance the user may establish an IM session with the business and interact in other ways. Messages sent from the user to the business may have to follow a particular semantic pattern (e.g., particular usage of grammar, etc.). This semantic pattern may be exposed to the user during the session or may be cached on the IM client at the mobile computing device 115. In this instance, the IM session may route the user to a bot or to an employee of the business enterprise. The eventual routing of the session to specific person could further take the preferences of the subscriber such as subscriber's interests, native language, age, sex, etc. The routing could also include queuing up sessions for an employee in case the employee is presently busy assisting another customer.

Within additional exemplary embodiments a user may correspond with the IM server 105 and search for certain classes of businesses enterprises (e.g., classes such as fast food restaurants, hardware stores, etc.). To accomplish this operation the user's location has to be conveyed to the IM server 105 so that the IM server 105 can respond with a listing of business enterprises that satisfy the class criteria and are in proximity to the user. As mentioned above, the user can convey his location by several means (e.g., built in through GPS, RF signal strength tracking, or the user manually inputting his location, for example through a map such as a building map or planogram).

Within yet further exemplary embodiments a business enterprise owner can enact access policies regarding who is allowed to access the business enterprise computing system 100 via a contact list 205 mechanism. For example, a parking lot may require that user's submit a credential before showing a map of the empty spaces. These permissions could be for specific time durations or indefinite. Standard mechanisms could be used to submit user's credentials. For example, some systems may require a temporary name, while other systems may require user IDs such as email addresses, and yet others may require certificates that are signed by a valid signing authority.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for advertising a business enterprise via an instant messaging (IM) environment, the method comprising:
   registering at least one business enterprise computing system application with an IM server;
   registering at least one subscriber with the IM server, wherein a subscriber initiates communication with the IM server via an IM client application that resides at a computing device, wherein messages received from the subscriber follow a particular semantic pattern including at least a particular usage of grammar, wherein the semantic pattern is exposed to the subscriber at least one of during an IM session and via a cache associated with the IM client application;
   delivering subscriber characteristics comprising at least one of the geographic location of a subscriber's computing device, the subscribers preferences, and subscriber status to the IM server, wherein the IM server utilizes the subscriber characteristics to determine the business enterprises that are relevant to subscriber;
   publishing the presence status of the determined business enterprises to the subscriber's computing device, wherein the presence status of a business enterprise and business enterprise identifiers are displayed to the subscriber within a contact list displayed at the subscriber's computing device;
   enacting rules that dictate types of business enterprises that may be displayed within the contact list, in addition to enacting protocols for the ranking and prioritization of business enterprises identifiers that are displayed within the contact list;
   automatically populating the contact list with the business enterprise identifiers upon the registration of the business enterprise computing system; and
   adding and removing the business enterprise identifiers to and from the contact list based upon a physical proximity of the subscriber's computing device to a physical business enterprise that is associated with the business enterprise computing system.

2. The method of claim 1, further comprising a subscriber establishing an IM session with the business enterprise computing system application by selecting a listing of the business enterprise from the displayed contact list.

3. The method of claim 2, wherein a business enterprise presents the subscriber with at least one business enterprise service offering.

4. The method of claim 3, wherein as a result of a subscriber's request for business enterprise service information during an IM session the business enterprise computing system initiates a live IM session with a business enterprise computing system operator.

5. The method of claim 3, wherein as a result of a subscriber's request for business enterprise service information during an IM session the business enterprise computing system routes the subscriber's request to a business enterprise content specific Internet bot.

6. The method of claim 5 where enterprise information comprises one of more of hours of operation, pricing information, availability of goods, popularity or rating of goods, status of business services, detailed information pertaining to services, instructions pertaining to use of goods and services.

7. The method of claim 6 where enterprise information is customized for subscriber based on subscriber characteristics.

8. The method of claim 6 where detailed information pertaining to services includes maps showing location of business or planograms showing locations of goods.

9. The method of claim 6 where detailed information pertaining to services includes tracking information of goods ordered or shipped through the business services.

10. The method of claim 6 where status information pertaining to services includes at least one of predicted wait times, number of seats left, number of parking spots left.

11. The method of claim 3, wherein the presence status of a business enterprise comprises information in regard to the availability of the business enterprise to establish an IM session with the subscriber.

12. The method of claim 11, wherein the availability of a business enterprise comprises information in regard to whether the business enterprise is available or not available to initiate an IM session, the expected wait time to establish an IM session, and the subscriber's position within a queue waiting of subscribers waiting to establish an IM session with the business enterprise.

13. The method of claim 1 where presence status includes delivering customized business enterprise advertising content from a business enterprise computing system to a subscriber's computing device in the instance that the subscriber initiates an IM session with the business enterprise computing system.

14. The method of claim 13, wherein customized business enterprise advertising content comprises business enterprise advertising content that is generated as a result of analyzing subscriber IM server registration information and information gathered from the IM session.

15. The method of claim 14, further comprising the monitoring of an IM session with a subscriber via a IM session activity monitoring component that resides at the business enterprise computing system, wherein the IM session activity monitoring component monitors the IM session with a subscriber and stores information in regard to information and services that are requested by the subscriber within an IM session, the monitored information being utilized in conjunction with the subscriber's IM server registration information to determine and generate custom business enterprise advertising content to deliver to the subscriber during subsequent IM sessions.

16. The method of claim 14, further comprising the exchange of security tokens between the IM client applications residing at the subscriber's computing device and a business enterprise's computing system before the business enterprise can be advertised within the contact list displayed at the subscriber's computing device.

17. A computer program product that includes a non-transitory computer readable medium useable by a processor, the medium having stored thereon a sequence of instructions which, when executed by the processor, causes the processor to advertise a business enterprise via an instant messaging (IM) environment, by:
  registering at least one business enterprise computing system application with an IM server;
  registering at least one subscriber with the IM server, wherein a subscriber initiates communication with the IM server via an IM client application that resides at a computing device, wherein messages received from the subscriber follow a particular semantic pattern including at least a particular usage of grammar, wherein the semantic pattern is exposed to the subscriber at least one of during an IM session and via a cache associated with the IM client application;
  delivering subscriber characteristics comprising at least one of the geographic location of a subscriber's computing device, the subscribers preferences, and subscriber status to the IM server, wherein the IM server utilizes the subscriber characteristics to determine the business enterprises that are relevant to subscriber;
  publishing the presence status of the determined business enterprises to a subscriber's computing device, wherein the presence status of a business enterprise and business enterprise identifiers are displayed to the subscriber within a contact list displayed at the subscriber's computing device;
  enacting rules that dictate types of business enterprises that may be displayed within the contact list, in addition to enacting protocols for the ranking and prioritization of business enterprises identifiers that are displayed within the contact list;
  automatically populating the contact list with the business enterprise identifiers upon the registration of the business enterprise computing system; and
  adding and removing the business enterprise identifiers to and from the contact list based upon a physical proximity of the subscriber's computing device to a physical business enterprise that is associated with the business enterprise computing system.

18. The computer program product of claim 17, wherein a business enterprise presents a subscriber with at least one business enterprise service offering.

19. The computer program product of claim 17 where presence status includes delivering customized business enterprise advertising content from a business enterprise computing system to a subscriber's computing device in the instance that the subscriber initiates an IM session with the business enterprise computing system.

20. The computer program product of claim 19, wherein customized business enterprise advertising content comprises business enterprise advertising content that is generated as a result of analyzing subscriber IM server registration information and information gathered from the IM session.

21. The computer program product of claim 20, further comprising the monitoring of an IM session with a subscriber via a IM session activity monitoring component that resides at the business enterprise computing system, wherein the IM session activity monitoring component monitors the IM session with a subscriber and stores information in regard to information and services that are requested by the subscriber within an IM session, the monitored information being utilized in conjunction with the subscriber's IM server registration information to determine and generate custom business enterprise advertising content to deliver to the subscriber during subsequent IM sessions.

22. The computer program product of claim 20, further comprising the exchange of security tokens between the IM client applications residing at the subscriber's computing device and a business enterprise's computing system before the business enterprise can be advertised within the contact list displayed at the subscriber's computing device.

23. A computer program product that includes a non-transitory computer readable medium useable by a processor, the medium having stored thereon a sequence of instructions which, when executed by the processor, causes the processor to receive business enterprise advertisements via an instant messaging (IM) environment, by:

delivering subscriber and subscriber computing device information to an IM server, wherein a subscriber logs on to the IM server via an IM client application that resides at a computing device, wherein messages received from the subscriber follow a particular semantic pattern including at least a particular usage of grammar, wherein the semantic pattern is exposed to the subscriber at least one of during an IM session and via a cache associated with the IM client application;

delivering subscriber characteristics comprising at least one of the geographic location of a subscriber's computing device, the subscribers preferences, and subscriber status to the IM server, wherein the IM server utilizes the subscriber characteristics to determine the business enterprises that are relevant to subscriber;

receiving published the presence status information associated with the determined business enterprises to the subscriber's computing device, wherein the presence status of a business enterprise is displayed to the subscriber within a contact list displayed at the subscriber's computing device;

enacting rules that dictate types of business enterprises that may be displayed within the contact list, in addition to enacting protocols for the ranking and prioritization of business enterprises identifiers that are displayed within the contact list;

automatically populating the contact list with the business enterprise identifiers upon the registration of the business enterprise computing system; and adding and removing the business enterprise identifiers to and from the contact list based upon a physical proximity of the subscriber's computing device to a physical business enterprise that is associated with the business enterprise computing system.

24. The computer program product of claim 23, further comprising a subscriber establishing an IM session with the business enterprise computing system application by selecting a listing of the business enterprise from the displayed contact list.

25. The computer program product of claim 23, further comprising the exchange of security tokens between the IM client applications residing at the subscriber's computing device and a business enterprise's computing system before the business enterprise can be advertised within the contact list displayed at the subscriber's computing device.

* * * * *